(12) United States Patent
Berry et al.

(10) Patent No.: US 10,239,151 B2
(45) Date of Patent: Mar. 26, 2019

(54) LINEAR FRICTION WELDING METHOD

(71) Applicant: ROLLS-ROYCE plc, London (GB)

(72) Inventors: Michael J Berry, Derby (GB); Andrew R Walpole, Derby (GB); Peter Wilson, Derby (GB)

(73) Assignee: ROLLS-ROYCE plc, London (GB)

( * ) Notice: Subject to any disclaimer, the term of this patent is extended or adjusted under 35 U.S.C. 154(b) by 348 days.

(21) Appl. No.: 15/184,417

(22) Filed: Jun. 16, 2016

(65) Prior Publication Data
US 2017/0014938 A1    Jan. 19, 2017

(30) Foreign Application Priority Data
Jul. 14, 2015  (GB) .................................. 1511541.3

(51) Int. Cl.
*B23K 20/12*      (2006.01)
*B23K 20/26*      (2006.01)
(Continued)

(52) U.S. Cl.
CPC ........ *B23K 20/1205* (2013.01); *B23K 20/129* (2013.01); *B23K 20/26* (2013.01);
(Continued)

(58) Field of Classification Search
CPC ... B23K 20/1205; B23K 20/129; B23K 20/26
See application file for complete search history.

(56) References Cited

U.S. PATENT DOCUMENTS

| 4,366,728 A | * | 1/1983 | Beck | B23D 63/20 |
| | | | | 451/194 |
| 5,511,300 A | * | 4/1996 | Merz | B29C 65/58 |
| | | | | 29/407.08 |

(Continued)

FOREIGN PATENT DOCUMENTS

| CN | 103331515 A | 10/2013 |
| CN | 103331515 B | 3/2015 |
| DE | 102006034053 A1 | 1/2008 |

OTHER PUBLICATIONS

Oct. 27, 2016 Search Report issued in European Patent Application No. 16174725.
(Continued)

*Primary Examiner* — Erin B Saad
(74) *Attorney, Agent, or Firm* — Oliff PLC

(57) ABSTRACT

A method linear friction welds a rotor blade to a disk. The method includes: providing a linear friction welding machine having disk tooling at which a disk is mounted, and further having blade tooling at which a blade is mountable; mounting a dummy blade at blade tooling, dummy blade carrying one or more first measurement devices which interact with mounted disk to measure position of dummy blade relative to disk; adjusting position and orientation of blade tooling relative to mounted disk until first measurement devices indicate that dummy blade is in a suitable alignment with disk to start linear friction welding a blade to disk; releasing dummy blade from blade tooling and mounting a production blade thereat; and linear friction welding the production blade to the disk with the blade tooling starting at adjusted position and orientation.

10 Claims, 3 Drawing Sheets

(51) Int. Cl.
*F01D 5/30* (2006.01)
*B23K 101/00* (2006.01)

(52) U.S. Cl.
CPC ...... *F01D 5/3061* (2013.01); *B23K 2101/001* (2018.08); *F05D 2230/239* (2013.01)

(56) References Cited

U.S. PATENT DOCUMENTS 5,901,426 A * 5/1999 Okazaki ............. B23K 37/0443
269/329
6,523,438 B1 2/2003 Gerling

OTHER PUBLICATIONS

Mar. 23, 2016 Search Report issued in British Patent Application No. 1511541.3.

* cited by examiner

LINEAR FRICTION WELDING METHOD

FIELD OF THE INVENTION

The present invention relates to a method of linear friction welding a rotor blade to a disk.

BACKGROUND

Friction welding is the process for welding together two bodies or workpieces by converting mechanical energy to heat energy by the friction between the engaging weld surfaces of the two workpieces. In rotary friction welding, the process involves effecting relative rotation between the two workpieces while the weld surfaces remain in engagement with each other. In linear friction welding, the process involves effecting relative lateral oscillation between the two workpieces while the weld surfaces remain in engagement with each other.

Compressors and turbines of gas turbine engines such as those used in aero engines typically include a plurality of rotor and stator vane assemblies. The rotor assemblies are designed to impart work into gases passing through the compressor and extract work from the gases passing through the turbine. The stator vane assemblies help to direct the working gases entering or exiting the rotor assemblies and thereby increase efficiency of the engine.

Each rotor assembly includes a disk and a plurality of blades attached to the disk so as to extend radially outwardly therefrom. Conventionally, the blades are attached to the disk by mechanical connections such as "fir tree" type connections where a fir tree shaped blade root is received within a complementary shaped recess in the disk. This means that the blade can be readily replaced in the event that it is damaged.

Recent developments have resulted in integrally bladed rotor assemblies or "blisks" in which the blades are formed integrally with the disk. These have advantages of reduced weight as compared to a standard rotor assemblies and improved aerodynamic efficiency.

Blisks can be formed by joining the blades onto the rim of the disk at respective blade stubs by linear friction welding (LFW). This is a process whereby one part is held stationary while the other part is oscillated against it under a forge load, the heat generated and the applied loads result in a weld, as upset material exudes as flash from the edges of the joint. Typically, the blade is oscillated relative to the disk, while the forge load is applied in the radial direction on the blade towards the disk or on the disk towards the blade. The blade is thereby joined to the disk.

An LFW machine has respective toolings at which the disk and the blade are mountable. To accommodate the forge load, the machine is relatively massive, and access to the relatively small working volume of the machine is restricted. However, it is essential that the blade and disk are suitable aligned at the start of the LFW process to ensure that the blade is welded to the disk at the correct position and in the correct orientation. To achieve this it is conventional to use a sacrificial set-up disk and blades matching the shapes of the production disk and blades. The set-up disk and a sacrificial blade are mounted in the respective machine toolings and welded together. Based on the outcome of that procedure, typically as determined by analysis of the dismounted welded blade and set-up disk using a coordinate measuring machine (CMM), adjustments can be made to the relative starting positions and orientations of the toolings. Further blades can be welded to the set-up disk as needed in order to refine the adjustments.

A disadvantage of this approach, however, is that it is time-consuming and also requires the production and consumption of relatively expensive sacrificial components.

SUMMARY

In a first aspect, the present invention provides a method of linear friction welding a rotor blade to a disk, the method including the steps of:
   providing a linear friction welding machine having disk tooling at which a disk is mounted, and further having blade tooling at which a blade is mountable;
   mounting a dummy blade at the blade tooling, the dummy blade carrying one or more first measurement devices which interact with the mounted disk to measure the position and orientation of the dummy blade relative to the disk;
   adjusting the position and orientation of the blade tooling relative to the mounted disk until the first measurement devices indicate that the dummy blade is in a suitable alignment with the disk to start linear friction welding a blade to the disk;
   releasing the dummy blade from the blade tooling and mounting a production blade thereat; and
   linear friction welding the production blade to the disk with the blade tooling starting at the adjusted position and orientation.

Advantageously, by providing the measurement devices on the dummy blade, alignment can be performed in situ in the limited working volume of an LFW machine, and the need for dismount from the tooling to perform CMM analysis can be avoided. Measuring the production disk also helps to reduces costs by eliminating the need for sacrificial blades and set-up disks.

Optional features of the invention will now be set out. These are applicable singly or in any combination with the first aspect of the invention.

The method may further include the step of storing the blade tooling position and orientation when the dummy blade is aligned with the disk. Then, if the step of releasing the dummy blade and mounting the production blade requires movement of the blade tooling, the method may further include the subsequent step of returning the blade tooling to the stored position and orientation.

The method may further include the steps of: releasing the welded production blade from the blade tooling and mounting a further production blade thereat; rotating to the disk tooling about the axis of the disk to index the angular position of the disk; and linear friction welding the further production blade to the disk with the blade tooling starting at the adjusted position and orientation. These steps can be repeated as often as needed, e.g. to weld a complete circumferential row of blades to the disk.

The step of adjusting the position and orientation of the blade tooling relative to the mounted disk may be performed with disk being held at a single angular position. Another option, however, is to adjust the position and orientation of the blade tooling relative to the mounted disk until the first measurement devices indicate that the dummy blade is in a suitable alignment with the disk to start linear friction welding a blade to the disk for a plurality of different angular positions of the disk. That is, the disk tooling can be rotated about the axis of the disk to index the angular position of the disk between adjustments of the blade tooling. An average of the adjusted positions and orientations can then be determined for subsequent use in the linear friction welding step. However, if the method includes linear friction welding one or more further production blades to the disk at different indexed angular positions, the indexing in the adjusting step can be matched to the indexing performed before each welding step so that each further blade is welded using a respective adjusted position and orientation.

The dummy blade may have an aerofoil portion matching an aerofoil portion of the production blade. Preferably, the production blade has a foot portion from which its aerofoil body extends radially outwardly and the dummy blade has a foot portion matching that of the production blade. The first measurement devices can then be carried by the foot portion of the dummy blade. The production blade typically has a body of sacrificial material which projects radially inwardly from its foot portion, the sacrificial material being consumed during the linear friction welding step. The first measurement devices of the dummy blade can then take the place of the body of sacrificial material. The disk typically also has a corresponding body of sacrificial material consumed during the linear friction welding step. Conveniently, the first measurement devices can interact the disk at this body of sacrificial material to measure the position and orientation of the dummy blade relative to the disk.

The blade tooling may carry one or more second measurement devices which interact with the dummy blade to measure the position and orientation of the aerofoil portion of the dummy blade relative to the positions and orientations of the first measurement devices. During the adjusting step, the position and orientation of the blade tooling relative to the mounted disk can then be adjusted until the first and second measurement devices indicate that the aerofoil portion of the dummy blade is in a suitable alignment with the disk for linear friction welding a blade to the disk. In this way, the alignment of the dummy blade to the disk can be the alignment of the aerofoil portion of the dummy blade to the disk.

The first measurement devices may include one or more contact transducers which make contact with the mounted disk to measure the position and orientation of the dummy blade relative to the disk, and/or one or more non-contact probes (e.g. laser probes) to measure the position and orientation of the dummy blade relative to the disk.

Similarly the second measurement devices may include one or more contact transducers which make contact with the aerofoil portion of the dummy blade to measure the position and orientation of the aerofoil portion relative to the first measurement devices, and/or one or more non-contact probes to measure the position and orientation of the aerofoil portion relative to the first measurement devices.

In a second aspect, the present invention provides a combination of a linear friction welding machine for welding a rotor blade to a disk, and a dummy blade, wherein:

the machine has disk tooling at which a disk is releasably mountable, and further has blade tooling at which the dummy blade is releasably mountable, the position and orientation of the blade tooling being adjustable relative to the disk tooling; and the dummy blade carrying one or more first measurement devices which can interact with a disk mounted at the disk tooling to measure the position and orientation of the dummy blade relative to the disk;

the machine further having a control system (e.g. a computerised control system) which is configured to store a blade tooling position and orientation when the dummy blade is mounted to the blade tooling and suitably aligned with the disk to start linear friction welding a blade to the disk, and to move the blade tooling to the stored position and orientation.

Thus the combination is suitable for performing the method of the first aspect. Optional features of the first aspect thus also apply to the second aspect.

For example, the blade tooling may carry one or more second measurement devices which can interact with the dummy blade when it is mounted to the blade tooling to measure the position and orientation of an aerofoil portion of the dummy blade relative to the positions and orientations of the first measurement devices.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
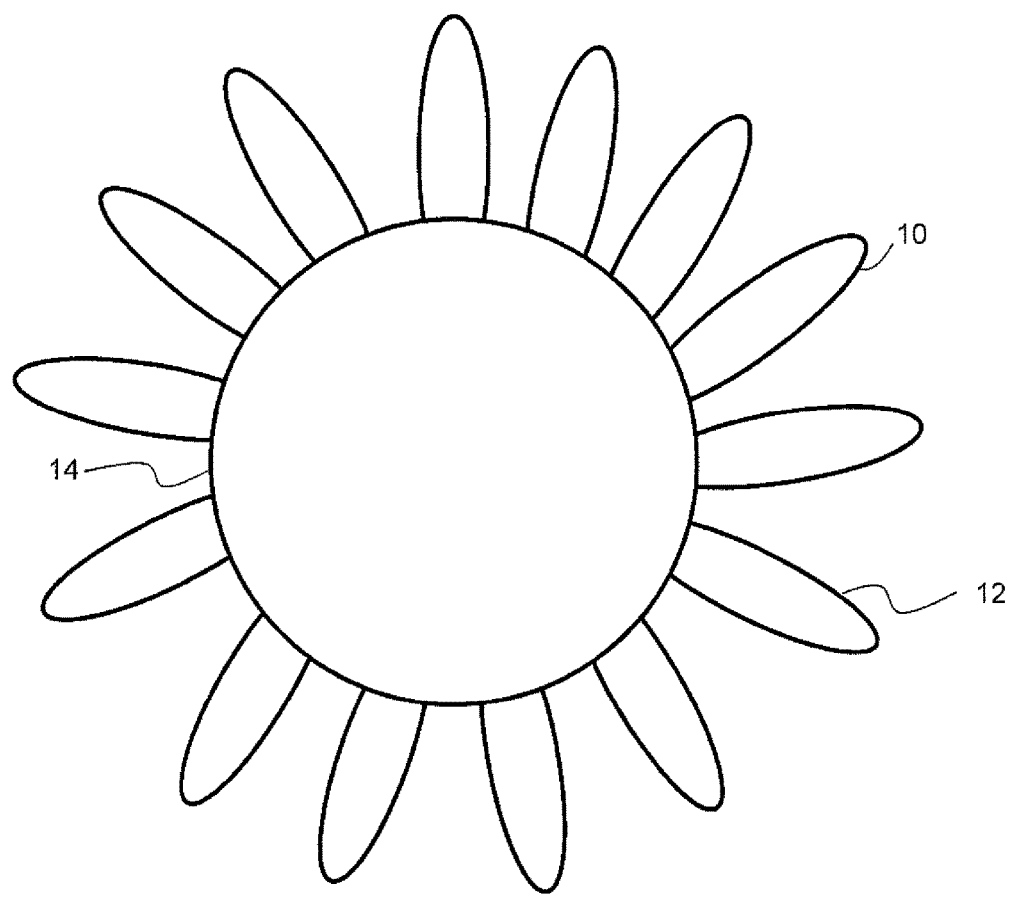
FIG. 1 is a perspective view of part of an integrally bladed rotor assembly.

Referring to FIG. 1, there is illustrated a part of an integrally bladed rotor assembly 10 which may be used in the compressor or turbine of an aero engine. The rotor assembly 10 includes a plurality of blades 12 attached to a rim of a disk 14 so as to extend radially outwardly therefrom. The blades 12 are typically of a titanium, nickel or steel alloy (a titanium 6-4 alloy commonly being used) and are attached to the rim by LFW. This can involve holding the disk stationary while a blade (generally in an un-machined/unfinished state) is oscillated against the rim under a radial forge load. For example, the blade member may be oscillated axially or tangentially against the rim. The heat generated by the oscillation together with the radial load results in the material of the blade member and rim becoming viscoplastic. When the material subsequently cools, bonds are formed and a weld is created between the rim and the blade. During the LFW process, upset material ("flash") is extruded from the sides of the joint. The blade is subsequently machined into shape, the material at the edges of the weld being removed.

Figure 2:
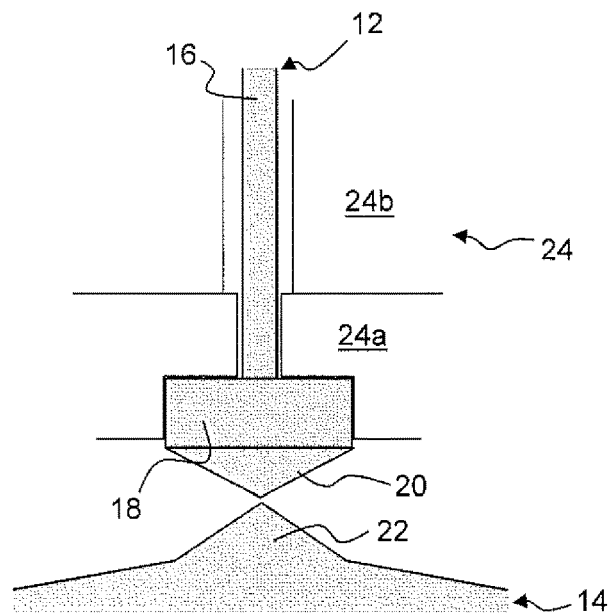
FIG. 2 shows schematically a production blade mounted at a blade tooling of a linear friction welding machine in a suitable alignment with a rim of a disk to start linear friction welding.

FIG. 2 shows schematically a production blade 12 in a suitable alignment with a rim of a disk 14 to start LFW. The blade has an aerofoil portion 16, a foot portion 18 from which the aerofoil portion extends radially outwardly, and a stub 20 of sacrificial material which projects radially inwardly from the foot portion. The disk has a corresponding stub 22 of sacrificial material which projects radially outwardly from its rim. The blade is mounted at a blade tooling 24 of a LFW machine, the blade tooling including a cassette 24a at the foot of the blade to which holds the blade and a forge block 24b radially outwardly of the cassette through which the radial forge load is transmitted. The machine has a further tooling (not shown) at which the disk is mounted.

During the LFW process, which results in the consumption of the stubs 20, 22, the disk 14 is held stationary while the blade 12 is oscillated against it under the forge load. When the process is completed, the blade is thus welded to the disk at its foot portion 18. The disk rim and foot portion can then be machined and finished.

To determine the initial alignment of the blade 12 a dummy blade 26 is used. This is shown schematically in FIG. 3 mounted at the blade tooling 24 of the LFW machine of FIG. 2. In place of the stub 20 of sacrificial material, the dummy blade has a plurality of first measurement devices 28, such as contact transducers and/or non-contact probes (e.g. laser probes) which measure the position and orientation of the dummy blade relative to the disk. For example, the measurement of position (three translational degrees of freedom) and orientation (three angular degrees of freedom) can be referenced to known features of the disk, such as the stub 22 of sacrificial material. These measurements are used to automatically or manually adjust the position and orientation of the blade tooling relative to the mounted disk (as indicated by the doubled headed arrows in FIG. 3) until the dummy blade is in a suitable alignment with the disk to start linear friction welding a blade to the disk.

The position and orientation measurements can be stored in a control system of the LFW machine. Thereafter the blade tooling 24 can be moved to facilitate mounting of the production blade 12 in place of the dummy blade 26. The blade tooling can then be returned (e.g. under the automatic control of the control system) to the stored position and orientation so that the production blade is initially aligned to start LFW, as shown in FIG. 2. This alignment procedure can be repeated for further production blades, with a new production blade taking the place of the previous production blade in the blade tooling and the disk tooling being rotated about the disk axis to index the disk to a next weld location.

In principle, realignment using the dummy blade only needs to be performed once for all the blades of a given blisk. In practice, however, to better assure correct alignment of all blades of the blisk, realignment using the dummy blade may be repeated, for example after each 90° rotation of the disk. Another option is to perform multiple adjustments of the position and orientation of the blade tooling using the dummy blade for different angular positions of the disk. An average of the adjusted positions and orientations can then be determined, and used to weld plural blades in their respective locations. Indeed, the two approaches can be combined so that a respective average adjusted position and orientation is determined for, say, each quadrant of the disk.

The dummy blade 26 enables automated on-machine verification of the relative positions of disk, blades, machine and tooling positions by incorporating a measurement system in the dummy blade which is compatible with a small working volume of the machine.

This in situ measurement procedure can help to improve quality by using the production tooling and disk for machine set-up, eliminating any part to part variation that comes from using a set-up disk. Measuring the production disk also helps to reduces costs by eliminating the need for sacrificial blades and set-up disks. In addition, in situ measurement and adjustment enables shorter delivery and production times, as removing the set-up tooling from the LFW machine and avoiding the need for CMM analysis reduces delay.

Figure 3:
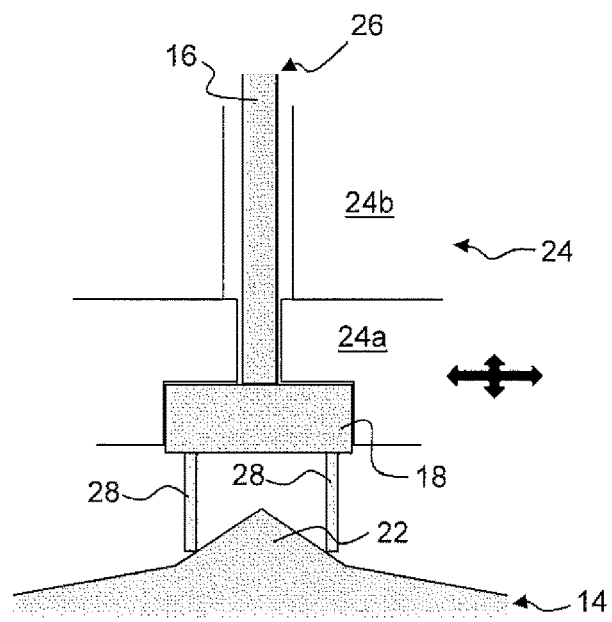
FIG. 3 shows schematically a dummy blade mounted at the blade tooling of the linear friction welding machine of FIG. 2.
Figure 4:
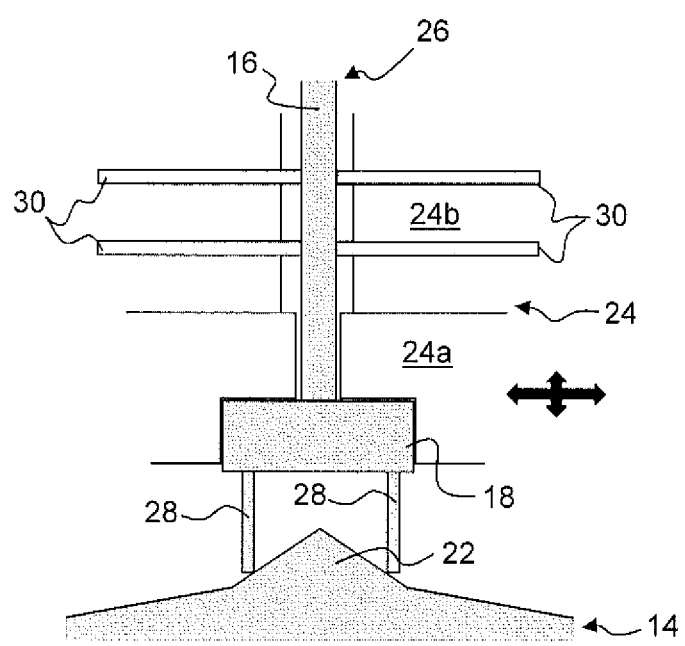
FIG. 4 shows schematically a variant of the blade tooling of FIG. 3.

FIG. 4 shows schematically a variant of the blade tooling of FIG. 3. In this variant, the blade tooling 24 carries one or more second measurement devices 30 (such as contact transducers and/or non-contact probes) which interact with the dummy blade 26 to measure the position and orientation of the aerofoil portion 16 of the dummy blade relative to the positions and orientations of the first measurement devices 28. The combination of the measurements of the first and second measurement devices thus allow the position and orientation of specifically the aerofoil portion of the dummy blade to be correctly aligned with the disk 14.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

The invention claimed is:

1. A method of linear friction welding a rotor blade to a disk, the method including the steps of:
   providing a linear friction welding machine having a disk tooling at which a disk is mounted, and further having a blade tooling at which a blade is mountable;
   mounting a dummy blade at the blade tooling, the dummy blade carrying one or more first measurement devices which interact with the mounted disk to measure a position and orientation of the dummy blade relative to the disk;
   adjusting a position and orientation of the blade tooling relative to the mounted disk until the one or more first measurement devices indicate that the dummy blade is in alignment with the disk to start linear friction welding a blade to the disk;
   releasing the dummy blade from the blade tooling and mounting a production blade thereat; and
   linear friction welding the production blade to the disk with the blade tooling starting at the adjusted position and orientation.

2. A method of linear friction welding according to claim 1, wherein:
   the adjusting step is performed by adjusting the position and orientation of the blade tooling relative to the mounted disk until the one or more first measurement devices indicate that the dummy blade is in alignment with the disk at a plurality of angular positions of the disk to start linear friction welding a blade to the disk, the disk tooling being rotated about an axis of the disk to index the angular position of the disk between adjustments;
   the method further includes determining an average of the adjusted positions and orientations; and
   the production blade is linear friction welded to the disk with the blade tooling starting at the average of the adjusted position and orientation.

3. A method of linear friction welding according to claim 1, further including the steps of:
   releasing the welded production blade from the blade tooling and mounting a further production blade thereat;
   rotating the disk tooling about an axis of the disk to index the angular position of the disk; and
   linear friction welding the further production blade to the disk with the blade tooling starting at the adjusted position and orientation.

4. A method of linear friction welding according to claim 1, wherein the dummy blade has an aerofoil portion matching an aerofoil portion of the production blade.

5. A method of linear friction welding according to claim 4, wherein:
   the production blade has an aerofoil body and a foot portion from which the aerofoil body extends radially outwardly; and the dummy blade has a foot portion matching that of the production blade, the one or more first measurement devices being carried by the foot portion of the dummy blade.

6. A method of linear friction welding according to claim 4, wherein:
the blade tooling carries one or more second measurement devices which interact with the dummy blade to measure a position and orientation of the aerofoil portion of the dummy blade relative to the positions and orientations of the one or more first measurement devices; and
during the adjusting step, the position and orientation of the blade tooling relative to the mounted disk is adjusted until the first and second measurement devices indicate that the aerofoil portion of the dummy blade is in alignment with the disk for linear friction welding a blade to the disk.

7. A method of linear friction welding according to claim 1, wherein the one or more first measurement devices include one or more contact transducers which make contact with the mounted disk to measure the position and orientation of the dummy blade relative to the disk.

8. A method of linear friction welding according to claim 1, wherein the one or more first measurement devices include one or more non-contact probes to measure the position and orientation of the dummy blade relative to the disk.

9. A system comprising:
a linear friction welding machine for welding a rotor blade to a disk; and
a dummy blade, wherein:
the machine has a disk tooling at which a disk is releasably mountable, and further has a blade tooling at which the dummy blade is releasably mountable, the position and orientation of the blade tooling being adjustable relative to the disk tooling; and
the dummy blade carrying one or more first measurement devices which can interact with a disk mounted at the disk tooling to measure the position and orientation of the dummy blade relative to the disk;
the machine further having a control system which is configured to store a blade tooling position and orientation when the dummy blade is mounted to the blade tooling and aligned with the disk to start linear friction welding a blade to the disk, and to move the blade tooling to the stored position and orientation.

10. A system according to claim 9, wherein the blade tooling carries one or more second measurement devices which can interact with the dummy blade when it is mounted to the blade tooling to measure the position and orientation of an aerofoil portion of the dummy blade relative to the positions and orientations of the one or more first measurement devices.

* * * * *